United States Patent
Ito et al.

(10) Patent No.: US 11,225,726 B2
(45) Date of Patent: Jan. 18, 2022

(54) COMPOSITE PLATED PRODUCT AND METHOD FOR PRODUCING SAME

(71) Applicant: DOWA METALTECH CO., LTD., Tokyo (JP)

(72) Inventors: Tsuyoshi Ito, Tokyo (JP); Yuta Sonoda, Tokyo (JP); Yukiya Kato, Tokyo (JP); Hiroto Narieda, Tokyo (JP)

(73) Assignee: DOWA METALTECH CO., LTD., Tokyo (JP)

( * ) Notice: Subject to any disclaimer, the term of this patent is extended or adjusted under 35 U.S.C. 154(b) by 87 days.

(21) Appl. No.: 16/749,140

(22) Filed: Jan. 22, 2020

(65) Prior Publication Data

US 2020/0232110 A1 Jul. 23, 2020

(51) Int. Cl.
*C25D 3/46* (2006.01)
*C01B 32/23* (2017.01)

(52) U.S. Cl.
CPC .............. *C25D 3/46* (2013.01); *C01B 32/23* (2017.08)

(58) Field of Classification Search
None
See application file for complete search history.

(56) References Cited

U.S. PATENT DOCUMENTS

| 2005/0282006 A1* | 12/2005 | Miyazawa | C25D 15/02 428/357 |
| 2013/0228465 A1* | 9/2013 | Zhang-Beglinger | H01B 1/02 205/50 |

FOREIGN PATENT DOCUMENTS

| JP | 3253598 A1 | 11/1991 |
| JP | 5505853 B2 | 8/1993 |
| JP | 097445 A | 1/1997 |
| JP | 2006037225 A | 2/2006 |
| JP | 2007016251 A | 1/2007 |
| JP | 2007262528 A | 10/2007 |

\* cited by examiner

*Primary Examiner* — Wojciech Haske
(74) *Attorney, Agent, or Firm* — Bachman and Lapointe PC; George Coury

(57) ABSTRACT

There are provided a composite plated product, which has little uneven appearance, a low contact resistance and good wear resistance, and a method for producing the same without the need of any silver-plating solutions containing cyanides and any silver-plating solutions containing silver nitrate as a silver salt. After carbon particles are caused to be suspended in water, an oxidizing agent is added thereto for carrying out a wet oxidation treatment of the carbon particles, and a silver-plating solution, which contains at least one sulfonic acid and the carbon particles treated by the wet oxidation treatment, is used for electroplating a base material to form a coating film of a composite material, which contains the carbon particles in a silver layer, on the base material to produce a composite plated product.

7 Claims, 2 Drawing Sheets

F I G. 1
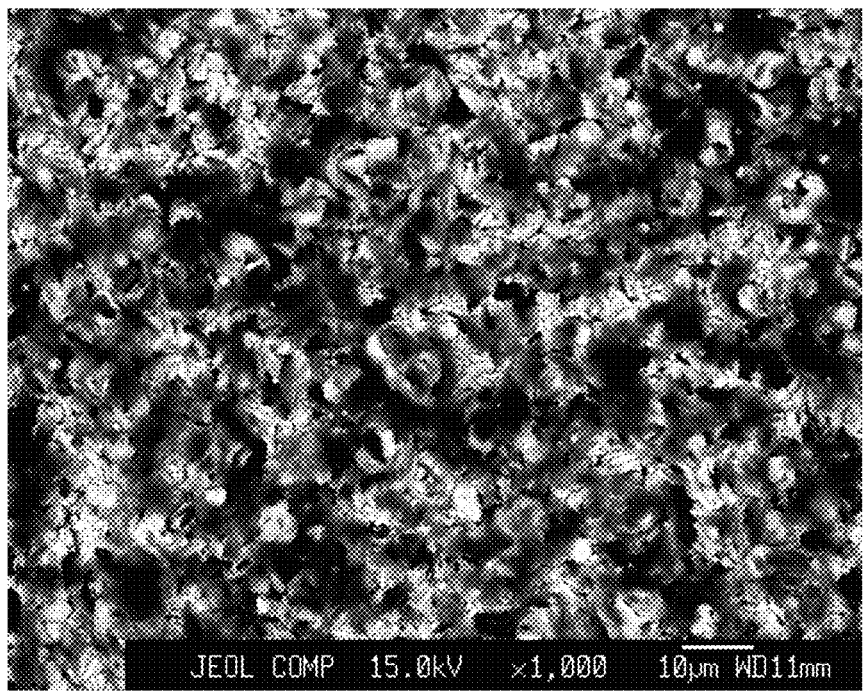

COMPOSITE PLATED PRODUCT AND METHOD FOR PRODUCING SAME

BACKGROUND OF THE INVENTION

Field of the Invention

The present invention generally relates to a composite plated product and a method for producing the same. More specifically, the invention relates to a composite plated product which is used as a material of sliding contact parts such as switches and connectors.

Description of the Prior Art

Conventionally, as materials of sliding contact parts such as switches and connectors, there are used silver-plated products wherein a conductive material such as copper or a copper alloy is plated with silver in order to prevent oxidation of the conductive material due to heating in sliding processes.

However, there is a problem in that silver-plating films are easily stripped by sliding since they are soft and easy to wear and since they generally have high friction coefficients. In order to solve this problem, there is proposed a method for improving the wear resistance of a conductive material by forming a coating film of a composite material on the conductive material by electroplating, the composite material containing graphite particles which are chosen from among carbon particles, such as graphite particles and carbon black particles, having good heat resistance, wear resistance, lubricity and so forth and which are dispersed in a silver matrix (see, e.g., Japanese Patent Laid-Open No. 9-7445). There is also proposed a method for producing a silver-plating film, which contains graphite particles, by means of a plating bath to which a wetting agent suitable for the dispersion of graphite particles is added (see, e.g., Japanese Patent Unexamined Publication No. 5-505853 (National Publication of Translated Version of PCT/DE91/00241)). Moreover, there is proposed a method for coating carbon particles with a metal oxide or the like by the sol-gel method to enhance the dispersibility of the carbon particles in a composite plating solution of silver and the carbon particles to increase the quantity of the carbon particles in a composite plating film (see, e.g., Japanese Patent Laid-Open No. 3-253598).

However, composite plated products produced by the methods disclosed in Japanese Patent Laid-Open No. 9-7445, Japanese Patent Unexamined Publication No. 5-505853 and Japanese Patent Laid-Open No. 3-253598 have a relatively high friction coefficient, so that there is a problem in that it is not possible to use the composite plated products as the materials of long-life contacts and terminals. Therefore, it is desired to provide a composite plated product which has a larger content of carbon and a higher percentage of an area occupied by carbon particles on the surface thereof than those of the composite plated products produced by the conventional methods and which has a better wear resistance than that of the composite plated products produced by the conventional methods.

As methods for producing such composite plated products, there are proposed a method for electroplating a base material using a silver-plating solution, which contains cyanides and carbon particles treated by an oxidation treatment, to form a coating film of a composite material, which contains the carbon particles in a silver layer, on the base material (see, e.g., Japanese Patent Laid-Open No. 2006-37225), a method for electroplating a base material using a silver-plating solution, which contains cyanides and carbon particles treated by an electrolytic treatment, to form a coating film of a composite material, which contains the carbon particles in a silver layer, on the base material (see, e.g., Japanese Patent Laid-Open No. 2007-16261), a method for electroplating a base material using a composite plating solution prepared by adding carbon particles, which are treated by an silane coupling treatment after being treated by an oxidation treatment, to a silver-plating solution containing silver nitrate and ammonium nitrate, to form a coating film of a composite material, which contains the carbon particles in a silver layer, on the base material (see, e.g., Japanese Patent Laid-Open No. 2007-262528), and so forth.

However, since the solution containing cyanides is used in the methods disclosed in Japanese Patent Laid-Open No. 2006-37225 and Japanese Patent Laid-Open No. 2007-16261, it is required to carry out an effluent treatment for an aqueous solution containing cyanides, so that the costs for a drainage facility are high. Since Ag is deposited as dendrite-shaped by electroplating in a silver-plating bath containing silver nitrate and ammonium nitrate in the method disclosed in Japanese Patent Laid-Open No. 2007-262528, there is some possibility that the uneven appearance of a composite plated product is large and that the contact resistance thereof is unstable. In addition, the long-term stability of the silver-plating bath is bad, so that the method is unsuited for the mass-production of composite plated products. ¥

SUMMARY OF THE INVENTION

It is therefore an object of the present invention to eliminate the aforementioned problems and to provide a composite plated product, which has little uneven appearance, a low contact resistance and good wear resistance, and a method for producing the same without the need of any silver-plating solutions containing cyanides and any silver-plating solutions containing silver nitrate as a silver salt.

In order to accomplish the aforementioned and other objects, the inventors have diligently studied and found that it is possible to produce a composite plated product, which has little uneven appearance, a low contact resistance and good wear resistance, without the need of any silver-plating solutions containing cyanides and any silver-plating solutions containing silver nitrate as a silver salt, if a silver-plating solution, which contains a sulfonic acid and oxidation-treated carbon particles, is used for electroplating a base material to form a coating film of a composite material, which contains the carbon particles in a silver layer, on the base material. Thus, the inventors have made the present invention.

According to the present invention, there is provided a method for producing a composite plated product, the method comprising the steps of: treating carbon particles by an oxidation treatment; adding the treated carbon particles to a silver-plating solution containing a sulfonic acid; and forming a coating film of a composite material, which contains the treated carbon particles in a silver layer, on a base material by electroplating the base material using the silver-plating solution containing the sulfonic acid and the treated carbon particles.

In this method for producing a composite plated product, the oxidation treatment is preferably a wet oxidation treatment. The wet oxidation treatment is preferably a treatment for causing the carbon particles to be suspended in water, and thereafter, adding an oxidizing agent thereto. The oxidizing agent is preferably selected from the group consisting of nitric acid, hydrogen peroxide, potassium permanganate, potassium persulfate, sodium persulfate and sodium perchlorate. The carbon particles are preferably scale-shaped graphite particles having an average particle diameter of 1 to 15 μm. The base material is preferably made of copper or a copper alloy. Moreover, a nickel plating film may be formed on the base material before the coating film of the composite material is formed.

According to the present invention, there is provided a composite plated product comprising: a base material; and a composite plating film of a composite material which contains carbon particles in a silver layer, the composite plating film being formed on the base material, wherein the percentage of an area occupied by the carbon particles on the surface of the composite plating film is in the range of from 40 area % to 80 area %, and wherein a ratio (X-ray diffraction intensity ratio I{200}/I{220}) of an integrated intensity I{200} at an X-ray diffraction peak on {200} plane of Ag on the surface of the composite plating film to an integrated intensity I{220} at an X-ray diffraction peak on {220} plane thereof is not greater than 10.

In this composite plated product, the surface of the composite plating film preferably has an arithmetic average roughness Ra of not less than 0.3 μm. The composite plating film preferably has a thickness of 0.5 to 20 μm. Moreover, a nickel plating film may be formed between the composite plating film and the base material.

According to the present invention, it is possible to produce a composite plated product, which has little uneven appearance, a low contact resistance and good wear resistance, without the need of any silver-plating solutions containing cyanides and any silver-plating solutions containing silver nitrate as a silver salt.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 1 is a compositional image in BE (Backscattered Electron) mode (COMPO image) of the surface of a composite plated product obtained by Example 1.

DESCRIPTION OF THE PREFERRED EMBODIMENTS

Figure 2:
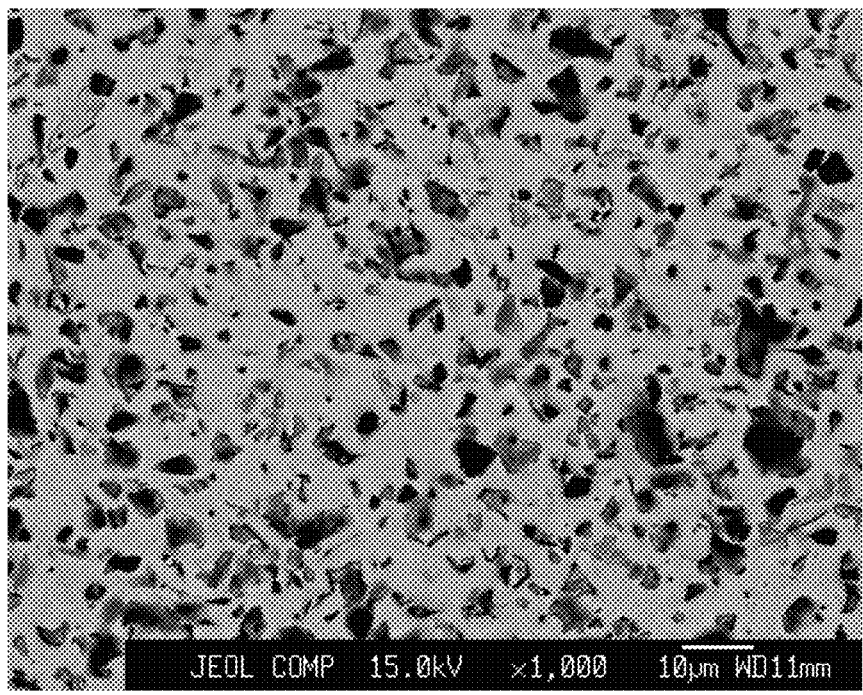
FIG. 2 is a COMPO image of the surface of a composite plated product obtained by Comparative Example 1.

In the preferred embodiment of a method for producing a composite plated product according to the present invention, a silver-plating solution, which contains at least one sulfonic acid and oxidation-treated carbon particles (preferably scale-shaped graphite particles having an average particle diameter of 1 to 15 μm), is used for electroplating a base material (preferably made of copper or a copper alloy) to form a coating film of a composite material, which contains the carbon particles in a silver layer, on the base material. Although it is not possible to cause carbon particles to be contained in a plating film if only the carbon particles are caused to be suspended in a silver-plating solution, it is possible to improve the dispersibility of the carbon particles if the carbon particles are oxidation-treated before they are put in the silver-plating solution as this preferred embodiment.

In the preferred embodiment of a method for producing a composite plated product according to the present invention, lipophilic organic substances absorbed onto the surface of carbon particles are removed by the oxidation treatment before the carbon particles are added to a silver-plating solution. Such lipophilic organic substances include aliphatic hydrocarbons, such as alkanes (such as nonane and decane) and alkenes (such as methylheptane), and aromatic hydrocarbons, such as alkylbenzene (such as xylene).

As the oxidation treatment for carbon particles, a wet oxidation treatment, a dry oxidation treatment using oxygen gas or the like may be used. In view of mass production, a wet oxidation treatment is preferably used. If a wet oxidation treatment is used, it is possible to uniformly treat carbon particles having a large surface area.

As the wet oxidation treatment, there may be used a method for suspending carbon particles in water containing a conductive salt to put therein platinum electrodes or the like as a cathode and an anode to carry out electrolysis, and a method for suspending carbon particles in water to add an optimum quantity of oxidizing agent thereto. In view of productivity, the latter is preferably used. The oxidizing agent may be nitric acid, hydrogen peroxide, potassium permanganate, potassium persulfate, sodium persulfate, sodium perchlorate or the like. It is considered that the lipophilic organic substances adhering to carbon particles are oxidized by the added oxidizing agent so as to be soluble in water to be suitably removed from the surface of the carbon particles. If the carbon particles treated by the wet oxidation treatment are filtered and washed with water, it is possible to further enhance the function of removing the lipophilic organic substances from the surface of the carbon particles.

The lipophilic organic substances, such as aliphatic and aromatic hydrocarbons, can be thus removed from the surface of the carbon particles by the above described oxidation treatment. According to analysis based on gases heated at 300° C., gases generated by heating carbon particles to 300° C. after the oxidation treatment hardly contain lipophilic aliphatic hydrocarbons such as alkanes and alkenes, and lipophilic aromatic hydrocarbons such as alkylbenzenes. Even if the carbon particles after the oxidation treatment slightly contain aliphatic and aromatic hydrocarbons, the carbon particles can be dispersed in a silver-plating solution. However, the carbon particles do not preferably contain hydrocarbons having a molecular weight of 160 or more, and the intensity (the intensity in purge and gas chromatography and mass spectroscopy) of gases generated at 300° C. from hydrocarbons having a molecular weight of less than 160 in the carbon particles is preferably 5,000,000 or less. It is considered that, if the carbon particles contain hydrocarbons having a large molecular weight, the surface of each of the carbon particles is coated with strong lipophilic hydrocarbons, and the carbon particles are coagulated in the silver-plating solution which is an aqueous solution, so that the carbon particles do not form a coating film of a composite material.

When carbon particles, from which aliphatic and aromatic hydrocarbons are removed by the above described oxidation treatment, are suspended in the silver-plating solution to carry out electroplating, a cyanide-free silver-plating solution containing at least one sulfonic acid is used as the silver-plating solution in place of a silver-plating solution containing cyanides (i.e., a cyanide-free sulfonic acid bath (containing no cyanide) for silver-plating is used as a silver-plating bath containing a silver-plating solution in place of a silver-plating bath containing cyanides). As the silver sulfonate, there may be used silver methanesulfonate, silver alkanolsulfonate, silver phenolsulfonate or the like. The silver-plating solution containing at least one sulfonic acid may contain a silver sulfonate serving as Ag ion source, sulfonic acid serving as a complexing agent, and an addition agent such as a brightener. The concentration of Ag in the silver-plating solution is preferably 5 to 150 g/L, more preferably 10 to 120 g/L and most preferably 20 to 100 g/L.

The amount of the carbon particles in the silver-plating solution is preferably 10 to 100 g/L, and more preferably 20 to 90 g/L. If the amount of the carbon particles in the silver-plating solution is less than 10 g/L, there is some possibility that it is not possible to sufficiently increase the content of the carbon particles in the composite plating layer. Even if the amount of the carbon particles in the silver-plating solution exceeds 100 g/L, it is not possible to further increase the content of the carbon particles in the composite plating layer.

The current density during electroplating is preferably 1 to 20 A/dm$^2$, and more preferably 2 to 15 A/dm$^2$. If the concentration of Ag and the current density are too low, the composite plating film is slowly formed, so that it is not efficient. If the concentration of Ag and the current density are too high, the uneven appearance of the composite plating film is easily caused.

In the preferred embodiment of a method for producing a composite plated product according to the present invention, since the carbon particles treated by the oxidation treatment are used, it is possible to obtain a composite plating solution wherein the carbon particles are uniformly dispersed in the silver-plating solution without adding any surfactants thereto, so that it is not required to add any surfactants thereto. In addition, if the silver-plating solution containing at least one sulfonic acid is used, it is possible to obtain a plating film which has a high percentage of an area occupied by the carbon particles on the surface of the plating film. It is considered that the reason why the plating film has the high percentage of the area occupied by the carbon particles on the surface of the plating film is that it is difficult to allow the carbon particles to drop off (or to be removed) from the surface thereof (similar to the function of removing stains by a detergent) when the surface thereof is washed with water after plating since any surfactants are not added thereto.

If the oxidation-treated carbon particles are thus added to the silver-plating solution, it is possible to sufficiently disperse the carbon particles in the silver-plating solution. If this silver-plating solution is used for electroplating, it is possible to form a coating film of a composite material, which contains the carbon particles dispersed in the silver layer, on the base material, so that it is possible to produce a composite plated product which has a high percentage of the area occupied by the carbon particles on the surface thereof and which has good wear resistance.

In the preferred embodiment of a composite plated product according to the present invention, a composite plating film of a composite material, which contains carbon particles in a silver layer, is formed on a base material, and the percentage of an area occupied by the carbon particles on the surface of the composite plating film is in the range of from 40 area % to 80 area % (preferably from 50 area % to 75 area %), the ratio (X-ray diffraction intensity ratio I{200}/I{220}) of an integrated intensity I{200} at an X-ray diffraction peak on {200} plane of Ag on the surface of the composite plating film to an integrated intensity I{220} at an X-ray diffraction peak on {220} plane thereof being not greater than 10 (preferably not greater than 8). If the percentage of the area occupied by the carbon particles on the surface of the composite plating film is less than 40 area %, the wear resistance of the composite plated product is insufficient. If the percentage of the area occupied by the carbon particles on the surface of the composite plating film exceeds 80 area %, the contact resistance of the composite plated product is increased.

In this composite plated product, the arithmetic average roughness Ra of the surface of the composite plating film is preferably not less than 0.3 μm, more preferably 0.4 to 5.0 μm, and most preferably 0.5 to 3.0 μm.

The thickness of the composite plating film is preferably 0.5 to 20 μm, more preferably 3 to 10 μm, and most preferably 3 to 8 μm. If the thickness of the composite plating film is less than 0.5 μm, the wear resistance of the composite plated product is insufficient. If the thickness of the composite plating film exceeds 20 μm, the amount of silver is large, so that the costs for producing the composite plated product is increased.

Furthermore, in the preferred embodiment of a composite plated product according to the present invention, the base material is not exposed after the reciprocating sliding movement is repeated preferably 5,000 times (more preferably 10,000 times) when the wear resistance thereof is evaluated by carrying out an abrasion test for confirming the abrasion status of the composite plated product when the reciprocating sliding movement (sliding distance=10 mm, sliding speed=3 mm/s) is continued until the base material is exposed while an indenter is pushed against a plate-shaped evaluating sample at a constant load (2N) by means of a sliding abrasion testing machine, the composite plated product being used as the plate-shaped evaluating sample, and the indenter being prepared by indenting (inside R=1.0 mm) a hard silver-plated product which is prepared by forming a hard silver-plating film (a hard silver-plating film (containing 3% by weight of tin) (thickness=30 μm, Vickers hardness=180 HV) produced by SUN-KK Corporation) on a plate material of Cu—Ni—Sn—P alloy (a plate material of a copper alloy comprising 1.0% by weight of nickel, 0.9% by weight of tin, 0.05% by weight of phosphorus and the balance being copper) (NB-109EH produced by DOWA METALTECH CO., LTD.) having a thickness of 0.2 mm.

Examples of a composite plated product and a method for producing the same according to the present invention will be described below in detail.

Example 1

As a base material, there was prepared a plate material of a Cu—Ni—Sn—P alloy (a plate material of a copper alloy comprising 1.0% by weight of nickel, 0.9% by weight of tin, 0.05% by weight of phosphorus and the balance being copper) (NB-109EH produced by DOWA METALTECH CO., LTD.) having a thickness of 0.2 mm. Then, this base material and a silver electrode plate were used as a cathode and an anode, respectively, for electroplating (silver strike plating) the base material at a current density of 3 A/dm$^2$ for 10 seconds in a silver strike plating solution containing a sulfonic acid as a complexing agent (Dyne Silver GPE-ST produced by Daiwa Fine Chemicals Co., Ltd.).

As carbon particles, there are prepared scale-shaped (plate-shaped) graphite particles having an average particle diameter of 5.0 μm. Furthermore, in Examples and Comparative Examples, the average particle diameter of the carbon particles was obtained as follows. First, 0.5 g of carbon particles were dispersed in 50 g of a solution containing 0.2% by weight of sodium hexametaphosphate, and further dispersed by ultrasonic waves. Then, the particle diameters of the carbon particles in a distribution based on volume were measured by means of a laser light scattering particle-size distribution measuring device, and a particle diameter at 50% in a cumulative distribution was assumed as the average particle diameter of the carbon particles.

Then, after 80 g of the above-described graphite particles were added to 1350 g of pure water to be heated to 50° C., a solution prepared by dissolving 27 g of potassium persulfate in 600 g of pure water was added thereto as an oxidizing agent to be stirred for 60 minutes to carry out a wet oxidation treatment. The carbon particles thus treated by the wet oxidation treatment were separated by suction filtration, washed with water, and then, dried.

Then, the oxidation-treated carbon particles were added to a silver-plating solution containing a sulfonic acid as a complexing agent and having a silver concentration of 30 g/L (Dyne Silver GPE-PL (dull luster) produced by Daiwa Fine Chemicals Co., Ltd.) so that the content of the carbon particles in the silver-plating solution was 30 g/L, and stirred to be dispersed therein.

Then, the above-described silver strike plated base material and a silver electrode plate were used as a cathode and an anode, respectively, for electroplating the base material at a temperature of 25° C. and a current density of 3 A/dm$^2$ for 150 seconds in a silver-plating solution containing the above-described oxidation-treated carbon particles while stirring the solution at 500 rpm. There was thus prepared a composite plated product wherein a composite plating film containing carbon particles in a silver-plating layer was formed on the base material. The thickness of the composite plating film (the area having a diameter of 1.0 mm in the central portion of the composite plating film) of the composite plated product was measured by means of an X-ray fluorescent analysis thickness meter (FT9450 produced by Hitachi High-Tech Science Corporation). As a result, the thickness thereof was 4.8 µm.

The surface of a test piece cut-off from the composite plated product thus obtained was observed to calculate the percentage (area ratio (area %)) of an area occupied by the carbon particles on the surface of the composite plating film. The area ratio of the carbon particles on the surface of the composite plating film was calculated as follows. First, the surface of the test piece was irradiated with electron beams at an irradiation current of $3\times10^{-7}$ A and an accelerating voltage of 15 kV by means of an electron probe microanalyzer (EPMA) (JXA8100 produced by JEOL Ltd.) to obtain a compositional image in BE mode (COMPO image) (at a magnification of 1000) by means of a backscattered electron detector (the COMPO image obtained in this example is shown in FIG. 1). The binarization of the tone of the COMPO image thus obtained was carried out by means of an image analyzing application (Image Editing/Processing Software GIMP 2.10.6) (so that pixels having a brightness of 127 or less was black and pixels having a brightness of greater than 127 was white assuming that the highest brightness of all of the pixels was 255 and that the lowest brightness thereof was 0). Thus, the COMPO image was divided into portions of silver (white portions) and portions of the carbon particles (black portions). The area ratio of the carbon particles on the surface of the composite plating film was calculated as a ratio Y/X of the number Y of the pixels of the portions of the carbon particles to the number X of the pixels of the whole image. As a result, the percentage (area ratio) of the area occupied by the carbon particles on the surface of the composite plating film was 72 area %. On the surface of the composite plating film, no uneven appearance was observed. Thus, the appearance of the composite plating film was good.

With respect to the composite plated product thus obtained, the image of the surface of the composite plating film taken at a magnification of 100 by means of a laser microscope (VKX-110 produced by Keyence Corporation) was used for calculating an arithmetic average roughness Ra serving as a parameter showing a surface roughness (in a direction perpendicular to the rolling directions of the plate material of the copper alloy), on the basis of JIS B0601 (2001) by means of an analyzing application (VK-HIXA Version 3.8.0.0 produced by Keyence Corporation). As a result, the arithmetic average roughness Ra of the surface of the composite plating film was 1.1 µm.

With respect to the obtained composite plated product, an X-ray diffraction analyzer (RINT-2100 produced by RIGAKU Corporation) was used for obtaining an X-ray diffraction pattern at a tube voltage of 20 kV and a tube current 20 mA by the 2θ method using a Co tube. From the X-ray diffraction pattern thus obtained, there were measured the integrated intensity I{200} at an X-ray diffraction peak on {200} plane of Ag on the surface of the composite plating film, and the integrated intensity I{220} at an X-ray diffraction peak on {220} plane thereof. These measured values were used for obtaining a ratio (X-ray diffraction intensity ratio I{200}/I{220}) of the integrated intensity I{200} at the X-ray diffraction peak on {200} plane of Ag on the surface of the composite plating film to the integrated intensity I{220} at the X-ray diffraction peak on {220} plane thereof. As a result, the ratio was 2.4.

Then, a hard silver-plated product prepared by forming a hard silver-plating film (a hard silver-plating film (containing 3% by weight of antimony) (thickness=30 µm, Vickers hardness=180 HV) produced by SUN-KK Corporation) on a plate material of Cu—Ni—Sn—P alloy (a plate material of a copper alloy comprising 1.0% by weight of nickel, 0.9% by weight of tin, 0.05% by weight of phosphorus and the balance being copper) (NB-109EH produced by DOWA METALTECH CO., LTD.) having a thickness of 0.2 mm was indented (inside R=1.0 mm) to be used as an indenter, and the plate-shaped silver plated product was used as an evaluating sample. Then, the wear resistance of the composite plated product was evaluated by carrying out an abrasion test for confirming the abrasion status of the composite plated product when the reciprocating sliding movement (sliding distance=10 mm, sliding speed=3 mm/s) was continued until the base material was exposed while the indenter was pushed against the evaluating sample at a constant load (2N) by means of a sliding abrasion testing machine (produced by Yamasaki-Seiki Co., Ltd.). After the reciprocating sliding movement was repeated 10,000 times, the central portion of the sliding scratch of the composite plated product was observed at a magnification of 200 by means of a microscope (VKX-1000 produced by Keyence Corporation), and the thickness of the composite plating film (the area having a diameter of 1.0 mm in the central portion of the sliding scratch of the composite plating film) of the composite plated product was measured by means of an X-ray fluorescent analysis thickness meter (FT9450 produced by Hitachi High-Tech Science Corporation). As a result, it was not confirmed that the (brown) base material was exposed, and the thickness thereof was 4.1 µm, so that it was found that the wear resistance of the composite plated product was good. The contact resistance of the composite plated product was measured during the sliding abrasion test. As a result, the maximum value of the contact resistance thereof was 1.6 mΩ.

Example 2

A composite plated product was prepared by the same method as that in Example 1, except that the current density was 1 A/dm$^2$ and the electroplating time was 450 seconds. The thickness of the composite plating film of the composite plated product was measured by the same method as that in Example 1. As a result, the thickness thereof was 4.9 μm.

With respect to the composite plated product thus obtained, the percentage (area ratio) of the area occupied by the carbon particles on the surface of the composite plating film was calculated by the same method as that in Example 1. As a result, the percentage (area ratio) thereof was 68 area %. The uneven appearance on the surface of the composite plating film was not observed, so that the appearance thereof was good.

With respect to the obtained composite plated product, the arithmetic average roughness Ra was calculated by the same method as that in Example 1. As a result, the arithmetic average roughness Ra thereof was 1.2 μm. With respect to the obtained composite plated product, the X-ray diffraction intensity ratio I{200}/I{220} was obtained by the same method as that in Example 1. As a result, the X-ray diffraction intensity ratio I{200}/I{220} thereof was 6.1.

Moreover, with respect to the obtained composite plated product, the sliding abrasion test was carried out for evaluating the wear resistance thereof by the same method as that in Example 1. As a result, after the reciprocating sliding movement was repeated 10,000 times, the base material was not exposed, and the thickness of the composite plating film was 3.7 μm, so that it was found that the wear resistance thereof was good. The contact resistance of the composite plated product was measured during the sliding abrasion test. As a result, the maximum value of the contact resistance thereof was 1.2 mΩ.

Example 3

The same base material as that in Example 1 and a nickel electrode plate were used as a cathode and an anode, respectively, to electroplate (nickel-plate) the base material at a liquid temperature of 45° C. and a current density of 4 A/dm$^2$ for 30 seconds in a nickel plating solution containing 80 g/L of nickel sulfamate and 45 g/L of boric acid while stirring the solution. Thus, a nickel plating film having a thickness of 0.2 μm was formed on the base material, and then, the silver strike plating was carried out by the same method as that in Example 1.

Then, a composite plated product was prepared by the same method as that in Example 1, except that the concentration of silver in the silver-plating solution containing the sulfonic acid was 80 g/L, that the current density was 7 A/dm$^2$ and that the electroplating time was 75 seconds. The thickness of the composite plating film of the composite plated product was measured by the same method as that in Example 1. As a result, the thickness thereof was 5.2 μm.

With respect to the composite plated product thus obtained, the percentage (area ratio) of the area occupied by the carbon particles on the surface of the composite plating film was calculated by the same method as that in Example 1. As a result, the percentage (area ratio) thereof was 69 area %. The uneven appearance on the surface of the composite plating film was not observed, so that the appearance thereof was good.

With respect to the obtained composite plated product, the arithmetic average roughness Ra was calculated by the same method as that in Example 1. As a result, the arithmetic average roughness Ra thereof was 0.7 μm. With respect to the obtained composite plated product, the X-ray diffraction intensity ratio I{200}/I{220} was obtained by the same method as that in Example 1. As a result, the X-ray diffraction intensity ratio I{200}/I{220} thereof was 4.4.

Moreover, with respect to the obtained composite plated product, the sliding abrasion test was carried out for evaluating the wear resistance thereof by the same method as that in Example 1. As a result, after the reciprocating sliding movement was repeated 10,000 times, the base material was not exposed, and the thickness of the composite plating film was 3.3 μm, so that it was found that the wear resistance thereof was good. The contact resistance of the composite plated product was measured during the sliding abrasion test. As a result, the maximum value of the contact resistance thereof was 1.3 mΩ.

Example 4

A composite plated product was prepared by the same method as that in Example 1, except that a plate material of a tough pitch copper (C1100R-1/2H) having a thickness of 0.3 mm was used as the base material. The thickness of the composite plating film of the composite plated product was measured by the same method as that in Example 1. As a result, the thickness thereof was 5.0 μm.

With respect to the composite plated product thus obtained, the percentage (area ratio) of the area occupied by the carbon particles on the surface of the composite plating film was calculated by the same method as that in Example 1. As a result, the percentage (area ratio) thereof was 67 area %. The uneven appearance on the surface of the composite plating film was not observed, so that the appearance thereof was good.

With respect to the obtained composite plated product, the arithmetic average roughness Ra was calculated by the same method as that in Example 1. As a result, the arithmetic average roughness Ra thereof was 0.9 μm. With respect to the obtained composite plated product, the X-ray diffraction intensity ratio I{200}/I{220} was obtained by the same method as that in Example 1. As a result, the X-ray diffraction intensity ratio I{200}/I{220} thereof was 2.2. Moreover, with respect to the obtained composite plated product, the sliding abrasion test was carried out for evaluating the wear resistance thereof by the same method as that in Example 1. As a result, after the reciprocating sliding movement was repeated 10,000 times, the base material was not exposed, and the thickness of the composite plating film was 3.8 μm, so that it was found that the wear resistance thereof was good. The contact resistance of the composite plated product was measured during the sliding abrasion test. As a result, the maximum value of the contact resistance thereof was 1.4 mΩ.

Example 5

The same base material as that in Example 1 and a nickel electrode plate were used as a cathode and an anode, respectively, to electroplate (nickel-plate) the base material at a liquid temperature of 45° C. and a current density of 4 A/dm$^2$ for 120 seconds in a nickel plating solution containing 80 g/L of nickel sulfamate and 45 g/L of boric acid while stirring the solution. Thus, a nickel plating film having a thickness of 1.1 g m was formed on the base material, and then, the silver strike plating was carried out by the same method as that in Example 1. Thereafter, a composite plated product was prepared by the same method as that in Example 1. The thickness of the composite plating film of the composite plated product was measured by the same method as that in Example 1. As a result, the thickness thereof was 5.2 μm.

With respect to the composite plated product thus obtained, the percentage (area ratio) of the area occupied by the carbon particles on the surface of the composite plating film was calculated by the same method as that in Example 1. As a result, the percentage (area ratio) thereof was 71 area %. The uneven appearance on the surface of the composite plating film was not observed, so that the appearance thereof was good.

With respect to the obtained composite plated product, the arithmetic average roughness Ra was calculated by the same method as that in Example 1. As a result, the arithmetic average roughness Ra thereof was 1.0 μm. With respect to the obtained composite plated product, the X-ray diffraction intensity ratio I{200}/I{220} was obtained by the same method as that in Example 1. As a result, the X-ray diffraction intensity ratio I{200}/I{220} thereof was 2.3.

Moreover, with respect to the obtained composite plated product, the sliding abrasion test was carried out for evaluating the wear resistance thereof by the same method as that in Example 1. As a result, after the reciprocating sliding movement was repeated 10,000 times, the base material was not exposed, and the thickness of the composite plating film was 3.9 μm, so that it was found that the wear resistance thereof was good. The contact resistance of the composite plated product was measured during the sliding abrasion test. As a result, the maximum value of the contact resistance thereof was 1.5 mΩ.

Comparative Example 1

The same base material as that in Example 1 and a titanium electrode plate coated with platinum were used as a cathode and an anode, respectively, to electroplate (silver strike plate) the base material at a liquid temperature of 25° C. and a current density of 3 A/dm² for 10 seconds in a silver strike plating solution containing cyanides, which is an aqueous solution containing 3 g/L of silver potassium cyanide and 100 g/L of potassium cyanide.

Then, a composite plated product was prepared by the same method as that in Example 1, except that the carbon particles treated by the same oxidation treatment as that in Example 1 were added to a silver-plating solution containing cyanides, which is an aqueous solution containing 100 g/L of silver potassium cyanide, 120 g/L of potassium cyanide and 4 mg/L of potassium selenocyanate serving as a brightener, to use it as the composite plating solution. The thickness of the composite plating film of the composite plated product was measured by the same method as that in Example 1. As a result, the thickness thereof was 4.9 μm.

With respect to the composite plated product thus obtained, the percentage (area ratio) of the area occupied by the carbon particles on the surface of the composite plating film was calculated by the same method as that in Example 1. As a result, the percentage (area ratio) thereof was 43 area %. The uneven appearance on the surface of the composite plating film was not observed, so that the appearance thereof was good. Furthermore, the COMPO image obtained in this comparative example is shown in FIG. 2.

With respect to the obtained composite plated product, the arithmetic average roughness Ra was calculated by the same method as that in Example 1. As a result, the arithmetic average roughness Ra thereof was 0.7 μm. With respect to the obtained composite plated product, the X-ray diffraction intensity ratio I{200}/I{220} was obtained by the same method as that in Example 1. As a result, the X-ray diffraction intensity ratio I{200}/I{220} thereof was 13.1. Moreover, with respect to the obtained composite plated product, the sliding abrasion test was carried out for evaluating the wear resistance thereof by the same method as that in Example 1. As a result, after the reciprocating sliding movement was repeated 10,000 times, the base material was exposed, and the thickness of the composite plating film was 0.3 μm, so that it was found that the wear resistance thereof was bad. The contact resistance of the composite plated product was measured during the sliding abrasion test. As a result, the maximum value of the contact resistance thereof was 1.4 mΩ.

Comparative Example 2

A composite plated product was prepared by the same method as that in Example 1, except that the oxidation treatment of the carbon particles was not carried out. The thickness of the composite plating film of the composite plated product was measured by the same method as that in Example 1. As a result, the thickness thereof was 5.1 μm.

With respect to the composite plated product thus obtained, the percentage (area ratio) of the area occupied by the carbon particles on the surface of the composite plating film was calculated by the same method as that in Example 1. As a result, the percentage (area ratio) thereof was 20 area %. The uneven appearance on the surface of the composite plating film was not observed, so that the appearance thereof was good.

With respect to the obtained composite plated product, the arithmetic average roughness Ra was calculated by the same method as that in Example 1. As a result, the arithmetic average roughness Ra thereof was 0.8 μm. With respect to the obtained composite plated product, the X-ray diffraction intensity ratio I{200}/I{220} was obtained by the same method as that in Example 1. As a result, the X-ray diffraction intensity ratio I{200}/I{220} thereof was 3.1. Moreover, with respect to the obtained composite plated product, the sliding abrasion test was carried out for evaluating the wear resistance thereof by the same method as that in Example 1. As a result, after the reciprocating sliding movement was repeated 10,000 times, the base material was exposed, and the thickness of the composite plating film was 0.2 μm, so that it was found that the wear resistance thereof was bad. The contact resistance of the composite plated product was measured during the sliding abrasion test. As a result, the maximum value of the contact resistance thereof was 2.0 mΩ.

The producing conditions and characteristics of the composite plated products in these examples and comparative examples are shown in Tables 1 and 2.

TABLE 1

| | Base Material | Thickness of Ni Plating Film (μm) | Ag Strike Plating Bath | Composite Plating Plating Bath | Thickness of Plating Film (μm) |
|---|---|---|---|---|---|
| Ex. 1 | NB109EH | — | Sulfonic Acid Bath | Sulfonic Acid Bath | 4.8 |
| Ex. 2 | NB109EH | — | Sulfonic Acid Bath | Sulfonic Acid Bath | 4.9 |
| Ex. 3 | NB109EH | 0.2 | Sulfonic Acid Bath | Sulfonic Acid Bath | 5.2 |
| Ex. 4 | C1100R | — | Sulfonic Acid Bath | Sulfonic Acid Bath | 5.0 |
| Ex. 5 | NB109EH | 1.1 | Sulfonic Acid Bath | Sulfonic Acid Bath | 5.2 |
| Comp. 1 | NB109EH | — | Cyanide Bath | Cyanide Bath | 4.9 |
| Comp. 2 | NB109EH | — | Sulfonic Acid Bath | Sulfonic Acid Bath | 5.1 |

TABLE 2

| | Proportion of C on Surface (area %) | Ra (μm) | I {200}/ I {220} | After Sliding Wear Test Exposure | Thickness of Composite Plating Film (μm) | Contact Resistance (mΩ) |
|---|---|---|---|---|---|---|
| Ex. 1 | 72 | 1.1 | 2.4 | not exposed | 4.1 | 1.6 |
| Ex. 2 | 68 | 1.2 | 6.1 | not exposed | 3.7 | 1.2 |
| Ex. 3 | 69 | 0.7 | 4.4 | not exposed | 3.3 | 1.3 |
| Ex. 4 | 67 | 0.9 | 2.2 | not exposed | 3.8 | 1.4 |
| Ex. 5 | 71 | 1.0 | 2.3 | not exposed | 3.9 | 1.5 |
| Comp. 1 | 43 | 0.7 | 13.1 | exposed | 0.3 | 1.4 |
| Comp. 2 | 20 | 0.8 | 3.1 | exposed | 0.2 | 2.0 |

What is claimed is:

1. A method for producing a composite plated product, the method comprising the steps of:
   treating carbon particles by an oxidation treatment;
   adding the treated carbon particles to a silver-plating solution containing a sulfonic acid; and
   forming a coating film of a composite material, which contains the treated carbon particles in a silver layer, on a base material by electroplating the base material using the silver-plating solution containing the sulfonic acid and the treated carbon particles.

2. A method for producing a composite plated product asset forth in claim 1, wherein said oxidation treatment is a wet oxidation treatment.

3. A method for producing a composite plated product as set forth in claim 2, wherein said wet oxidation treatment is a treatment for causing said carbon particles to be suspended in water, and thereafter, adding an oxidizing agent thereto.

4. A method for producing a composite plated product as set forth in claim 3, wherein said oxidizing agent is selected from the group consisting of nitric acid, hydrogen peroxide, potassium permanganate, potassium persulfate, sodium persulfate and sodium perchlorate.

5. A method for producing a composite plated product as set forth in claim 1, wherein said carbon particles are scale-shaped graphite particles having an average particle diameter of 1 to 15 μm.

6. A method for producing a composite plated product as set forth in claim 1, wherein said base material is made of copper or a copper alloy.

7. A method for producing a composite plated product as set forth in claim 1, which further comprises a step of forming a nickel plating film on said base material before the step of forming said coating film of said composite material.

* * * * *